United States Patent Office.

CAROLINE McCLEARY, OF HOLLIDAYSBURG, PENNSYLVANIA, EXECUTRIX OF THE LAST WILL AND TESTAMENT OF DAVID McCLEARY, DECEASED, ASSIGNOR TO GEORGE H. McCLEARY, OF THE SAME PLACE.

Letters Patent No. 66,982, dated July 23, 1867.

IMPROVEMENT IN RENOVATING HARNESS AND OTHER ARTICLES MADE OF LEATHER.

The Schedule referred to in these Letters Patent and making part of the same.

TO ALL WHOM IT MAY CONCERN:

Be it known that DAVID McCLEARY, deceased, late of Hollidaysburg, Blair county, Pennsylvania, did, during his lifetime, invent a new and useful Improvement in Cleaning Harness and other Leather; and I, CAROLINE McCLEARY, executrix of the last will and testament of said DAVID McCLEARY, deceased, do hereby declare that the following is a full, clear, and exact description thereof, which will enable others skilled in the art to fully understand and make use of the same.

This invention has for its object to furnish an improved process, by the use of which old harness and other dry and hard leather may be renovated or made soft, pliable, and tough; and it consists in soaking the leather in a preparation of sumach, wood ashes, sal-soda, and yarrow, mixed in the proportions and prepared and applied in the manner hereinafter more fully described.

In preparing this composition use the ingredients in the following proportions: five pounds of sumach of the last year's growth, one and a half peck of wood ashes, one and a half pound of sal-soda, and one and a half pound of yarrow. These ingredients should be well boiled in a large kettle, and then poured into a barrel of the ordinary size, or into any convenient cask or vessel of the same capacity, which should be filled up with rain or soft water. The harness or other leather to be cleaned and softened is then put into this barrel and allowed to remain in the decoction twenty-four hours, or longer if it is very hard and dry. The harness or leather is then taken out, thoroughly washed in clean water, and afterwards well oiled. The oil for this purpose should have lamp-black mixed with it in about the proportion of one quarter of a pound of lamp-black to two gallons of oil Harness or leather treated in this way, however dry and hard it may have been, will become soft, pliable, and thoroughly renovated, so that strings cut from it will be as strong as if cut from new leather.

I claim as new, and desire to secure by Letters Patent—

The composition for cleaning old harness and other dry and hard leather, composed of the ingredients in the proportions and prepared and applied in the manner substantially as herein described and set forth.

CAROLINE McCLEARY,
*Executrix of the last Will and Testament of David McCleary, deceased.*

Witnesses:
CH. S. LILLY,
C. D. BOWERS.